(12) United States Patent
Huang

(10) Patent No.: US 12,395,849 B2
(45) Date of Patent: Aug. 19, 2025

(54) METHOD FOR SECURING COMMUNICATION

(71) Applicant: MERCEDES-BENZ GROUP AG, Stuttgart (DE)

(72) Inventor: Mei Huang, Heidelberg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 95 days.

(21) Appl. No.: 18/007,794

(22) PCT Filed: May 21, 2021

(86) PCT No.: PCT/EP2021/063570
§ 371 (c)(1),
(2) Date: Dec. 2, 2022

(87) PCT Pub. No.: WO2021/244866
PCT Pub. Date: Dec. 9, 2021

(65) Prior Publication Data
US 2023/0232238 A1 Jul. 20, 2023

(30) Foreign Application Priority Data
Jun. 3, 2020 (DE) ...................... 10 2020 003 329.6

(51) Int. Cl.
*H04W 12/63* (2021.01)
(52) U.S. Cl.
CPC .................................. *H04W 12/63* (2021.01)
(58) Field of Classification Search
CPC combination set(s) only.
See application file for complete search history.

(56) References Cited

U.S. PATENT DOCUMENTS

| 10,674,359 | B2 * | 6/2020 | Han | ........................ G01S 19/42 |
| 10,913,453 | B2 * | 2/2021 | Min | ...................... B60W 30/09 |
| 11,356,425 | B2 * | 6/2022 | Kruger | ................ H04L 63/0435 |

(Continued)

FOREIGN PATENT DOCUMENTS

KR 101538331 B1 7/2015

OTHER PUBLICATIONS

Anwar et al., "Cloud-based Sybil Attack Detection Scheme for Connected Vehicles," 2019, pp. 114-121, doi: 10.1109/CSNet47905. 2019.9108923 (Year: 2019).*

(Continued)

*Primary Examiner* — Philip J Chea
*Assistant Examiner* — Bin Qing Zheng
(74) *Attorney, Agent, or Firm* — PATENT PORTFOLIO BUILDERS PLLC

(57) ABSTRACT

A method for securing communication between at least two participants, each having an identification and a safeguard and communicate therewith, in encrypted form involves the participants exchanging exchange their identification. At least one of the participants communicates its position in addition to its identification to the other participant. The position of the participant being determined or queried by the other participant without any assistance on the part of the participant, the participant then validating the other participant based on a comparison of the communicated position and the determined or queried position.

17 Claims, 2 Drawing Sheets

(56) References Cited

U.S. PATENT DOCUMENTS

2009/0271112 A1* 10/2009 Basnayake ............. G08G 1/161
  701/469
2019/0140850 A1* 5/2019 Ambrosin ............. H04W 12/06

OTHER PUBLICATIONS

Abu-Elkheir et al., "Map-guided trajectory-based position verification for vehicular networks," 2012, pp. 2538-2542, doi: 10.1109/WCNC.2012.6214226 (Year: 2012).*

Esselborn et al., "Map Attribute Validation using Historic Floating Car Data and Anomaly Detection Techniques," In Proceedings of the 6th International Conference on Vehicle Technology and Intelligent Transport Systems—VEHITS, I, SciTePress, May 2-4, 2020p. 504-514. DOI: 10.5220/00094259050405 (Year: 2020).*

Chivers, "Differential GPS Explained," 2003, https://www.esri.com/about/newsroom/arcuser/differential-gps-explained/ (Year: 2003).*

Allig et al.; "Trustworthiness Estimation of Entities within Collective Perception;" 2019 IEEE Vehicular Networking Conference (VNC); Dec. 4-6, 2019; Los Angeles, CA, USA.

Anwar et al.; "Cloud-based Sybil Attack Detection Scheme for Connected Vehicles;" 2019 3rd Cyber Security in Networking Conference (CSNet); Oct. 23-25, 2019; Quito, EC.

ETSI; "Intelligent Transport Systems (ITS); Vehicular Communications; Basic Set of Applications; Part 2: Specification of Cooperative Awareness Basic Service;" Final draft ETSI EN 302 637-2 V1.3.1; Sep. 2014.

International Search Report and Written Opinion mailed Sep. 3, 2021 in related/corresponding International Application No. PCT/EP2021/063570.

Kung; "Secure Vehicle Communication;" SeVeCom; Feb. 15, 2008.

Leinmüller et al.; "Improved Security in Geographic Ad hoc Routing through Autonomous Position Verification;" VANET '06; Sep. 29, 2006; Los Angeles, CA, USA.

Office Action created Apr. 22, 2021 in related/corresponding DE Application No. 10 2020 003 329.6.

Office Action dated May 23, 2024 in related/corresponding KR Application No. 10-2022-7041569.

* cited by examiner

METHOD FOR SECURING COMMUNICATION

BACKGROUND AND SUMMARY OF THE INVENTION

Exemplary embodiments of the invention relate to a method for securing communication between at least two participants, as well as to the use of such a method.

Methods for communicating between two or also more participants, which are appropriately secured, are known from the prior art. Typically, each of the participants has identification, for example a username, user ID or similar, as well as means of security for communication, for example via a password-protected account or similar. The actual securing of the communication then technically occurs by means of encryption. The password is likewise the "key" to this.

It is always problematic in such approaches that the fundamental danger exists that the data of a participant, for example their means of security and password, is stolen. Instead of the previous participant, criminal hackers can then get in contact with the other participant, and can make them believe that they are the participant that was actually expected, due to the identification and password that they know. This type of verification, which is so commonly prevalent, and can, instead of a password, also use other means such as, for example, storage devices or similar, is typically used for many types of communication. As shown in the example outlined above, it is, however, not secure in the case that user data is known to other people, is stolen, or has been hacked.

Exemplary embodiments of the present invention are directed to providing improved security for communication between participants, which, via further verification still offers high security, even in the case of stolen or hacked participant data.

In the method for securing communication between at least two participants according to the invention, it is the case that they, just as in the prior art, have identification, for example a user ID, a customer number or similar. They also have a means of securing the communication, for example by means of a personal identification number (PIN), a password, or similar. The two participants are thereby in the position to communicate in an encrypted manner. However, there is the above-described issue that, in the case of a theft of the identification and the password or similar, an unauthorized person can enter in the place of one of the participants. Significant damages can thereby occur, since, for example, malware can be introduced into a system. If the system is, for example, a motor vehicle, then significant disadvantages concerning traffic safety and the safety of the user thereby arise.

It is thus the case according to the invention, that at least one of the participants transmits their position to the other participant with their identification, as a physical characteristic. This characteristic cannot really be manipulated, since a participant can only be in one place. They share this with the other participant. Parallel to this, the other participant checks this position of their respective counterpart without their intervention, so, here, of the first participant, also in a parallel way, for example by means of active tracking via satellite navigation.

The second participant now has a set of data shared by the other participant and requested without their intervention, optionally even without their knowledge. The two sets of data and, here in particular, the positions of the first participant can thus be accordingly compared by the other participant. If these match, then the shared position can be validated accordingly. Due to this additionally transmitted physical characteristic, it can be assumed in the case that this is correct, that the first participant is actually the expected participant. A higher degree of security is thus possible and the danger that a hacker has "crept in" and accordingly misused the communication can be relatively certainly ruled out.

So if, for example, a vehicle control system wants to download an update that is relevant to traffic safety, then it can validate its counterpart by means of the method according to the invention, based on the physical characteristic of its position. It can therefore be ruled out with high probability that a manipulated software is being offered to it by a hacker, which could lead to safety problems or similar.

An especially favorable embodiment of the method according to the invention thereby provides that the participants validate each other's position. This makes the method especially secure.

According to a very advantageous development of the invention, it is thereby the case that in the course of communication, a time stamp is automatically transmitted together with sharing the personal position. Based on this time stamp, corresponding signals can, then, be easily and efficiently processed, in order to calculate the signal delay time from the respective participant, via several navigation satellites, to the other participant or, if these are spaced too far apart from each other, via one or several relay stations, typically in the form of a satellite control center.

In different satellite systems, different requirements are in place. It is therefore, for example, the case that active tracking is part of the service offer for the satellite navigation system Beidou that is currently available, especially in the Asiatic and Pacific area, so that the position of the respective other participant can easily be actively requested via the satellite navigation system. In other satellite systems, this function is readily available. It can, however, be used in that the position of the respective other participant is calculated from the signal delay time between the participants and the navigation satellites, based on the time stamp, according to an advantageous development of the method according to the invention. An appropriately precise calculation of the signal delay time is hereby possible. If, in particular, four navigation satellites are included in the calculation, according to a very advantageous development of this idea, then a very precise image of the position of the respective participant is produced.

This position can then be compared with the position shared by the participant, to validate the security. If these do not match, or if the match lies outside a tolerance area or an area resulting, if applicable, from the movement of one of the participants, then it must be assumed that the request does not originate from the participant themselves, rather, for example, from a hacker who actually has access to the account, however does not know the actual location of the participant at the current point in time. In this case, the security of the communication cannot be validated, so no communication is achieved and a potential hacker is thus not in a position to use the account of the participant.

Depending on the distance of the participants from each other, the transmission of the data to the navigation satellites as well as the calculation can occur directly. They can, however, also occur via one or several relay stations, in particular a satellite control center as a service provider, or the corresponding position can be provided by this service provided.

According to an extremely favorable development of the method according to the invention, it can now also be provided that the position that was shared and/or determined is validated by means of map data. A further level of security is thereby possible. By validating the position using map data, it can, for example, be taken into account that the position that was shared and/or determined accordingly differs, for example, from a position that was shared and/or determined shortly before or during the course of the last communication. If the difference is in a low displacement range, then this is probably non-critical. However, if it is at such a large distance that the participant could most likely not have covered this distance in the time between the two communications, then this is also already an indication that the account of the participant has been hacked, and the participant is not themselves involved in the communication.

According to an advantageous development of the invention, places, distances, and/or periods of time between saved places and current places can be used for validation using map data. In addition to the example already mentioned above, places can also be specified as especially secure or unsecure. If communication is, for example, established between a service provider and a vehicle as participants, then, for example, workshops, the personal garage of the vehicle owner, or similar can be marked as secure places. Moreover, places that, for example, cannot be reached with the vehicle can be specified as places that are illogical and thus not suitable for validation, for example mountainous regions, landscapes without navigable road for the vehicle, or similar.

The method according to the invention can take place for securing every kind of communication between participants, in order to validate different accounts with a physical characteristic of the participant, in the form of their position. The method is, here, especially well-suited to securing a communication between a service center of a vehicle manufacturer and the vehicles manufactured by them. Therefore, it is provided according to a favorable application of the method according to the invention that the method for securing communication between vehicles or servers and vehicles is used. Correspondingly secure communication can hereby be established, whereby a very high security regarding the data transmitted can be guaranteed. The method according to the invention thus makes it possible to create a substantially manipulation-free opportunity in order to, for example, transmit important information from a server of the vehicle manufacturer to the vehicle, for example software updates with content relevant to safety, which, for example, comprises driving functions, driver assistance systems, autonomous driving functions, and similar. According to a very advantageous development of the application according to the invention, it can therefore be provided that this is used for the transmission of software updates.

The invention also relates to a computer program product, by means of which the method can be implemented.

Further advantageous embodiments of the method according to the invention also arise from the exemplary embodiment, which is shown below in more detail, with reference to the figures.

BRIEF DESCRIPTION OF THE DRAWING FIGURES

Here:

DETAILED DESCRIPTION

Figure 1:
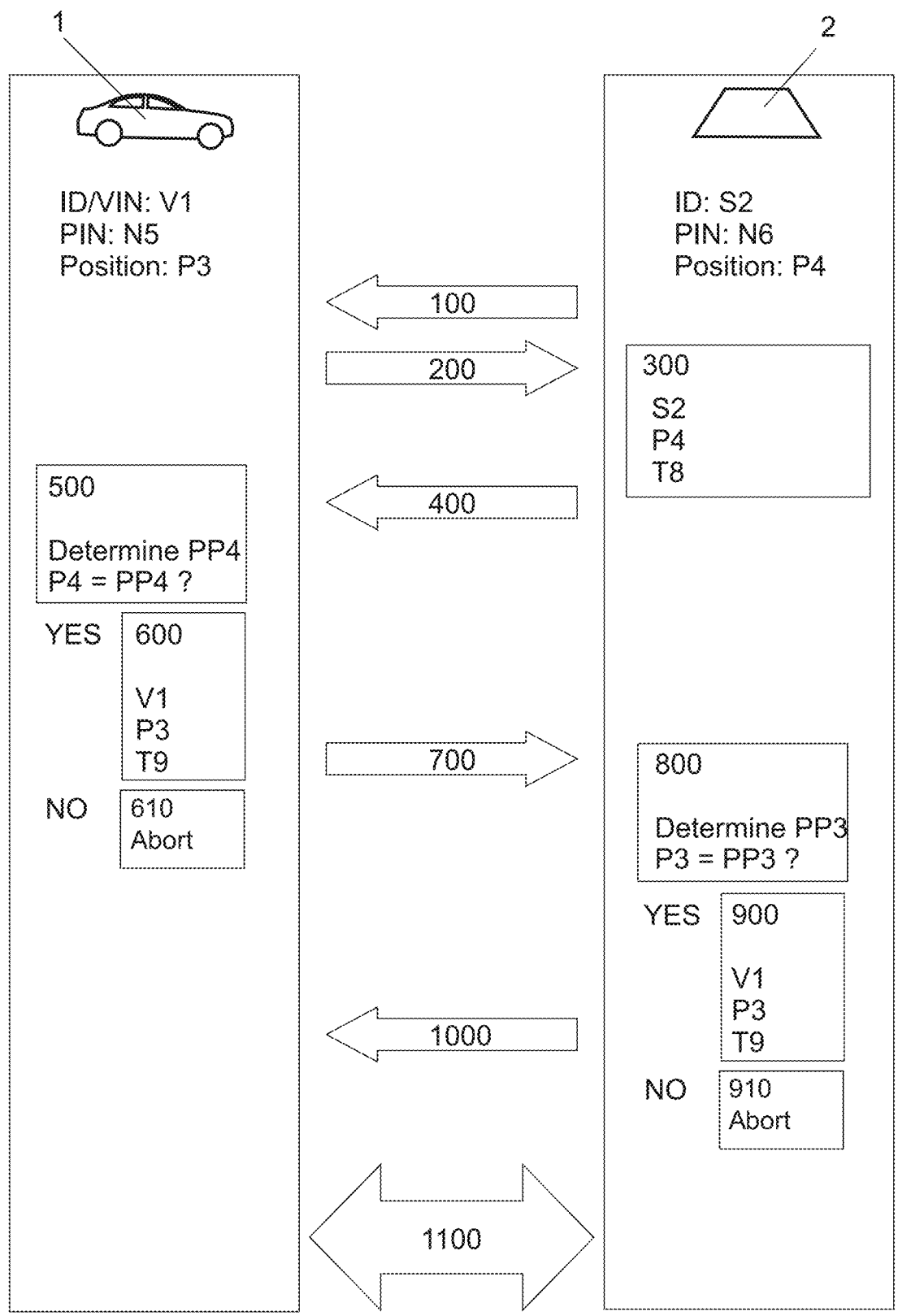
FIG. 1 shows an exemplary process for securing communication a well as for using the security by means of the method according to the invention.

FIG. 1 schematically illustrates how the method according to the invention works and can be used, in different successive steps. In the depiction of FIG. 1, a participant 1 in the form of a vehicle 1 is depicted on the left; in the depiction of FIG. 1, there is, for example, a service center 2 of the vehicle manufacturer or their backend server as the participant 2 on the right. The vehicle 1 has communication with the service center as participant 2 via a corresponding account. Its identification (ID) can, for example, be the vehicle identification number. In the exemplary embodiment shown here, it is V1. The vehicle 1 also has a PIN as a participant, which is here purely illustratively indicated with N5. The service center 2, as the second participant, also has an ID, which is here illustratively indicated with S2. The PIN of the service center 2 is illustratively indicated with N6. It is also the case that both participants 1, 2 are in a corresponding position, so are in a geodetic position. This position is indicated with P3 in the case of the vehicle 1 being a participant, and with P4 in the case of the service center 2 being the participant.

In a first step 100, a request is sent out starting from the service center 2, to the vehicle 1 with identification V1, for example with the notification that a software update is due. As a participant, the vehicle 1 with the identification V1 establishes a communication with the service center, using its account with the identification V1 and the corresponding PIN, and asks who sent the message from the first step 100. In the depiction of FIG. 1, this is the second step 200. In the area of the service center 2, this now leads to the third step 300, in which this service center shares its current position P4, together with its identification and a time stamp T8. This data is transmitted to the vehicle 1 in the fourth step 400. In the fifth step 500, the vehicle 1 now calculates the physical position PP4 of the service center 2, for example based on the time stamp T8 and the signal delay time between the service center 2 and at least four satellites 3.1, 3.2, 3.3 and 3.4, that are later described in more detail, as well as, if necessary, using a satellite control center 4. On completing this fifth step 500, it can then be checked whether the position PP4 calculated in this way corresponds to the shared position P4. If this is the case, communication is correspondingly validated and, in turn, the specific position is combined with the personal ID and a specific time stamp 9 in a sixth step 600, and, in a seventh step 700, is sent to the service center 2 together with a confirmation of the validation on the part of the vehicle 1. If P4 and PP4 do not match, the communication from the vehicle 1 is aborted in the step 610.

In an eighth step 800, the check carried out by the vehicle 1 in the fifth step 500 is then also carried out on the part of the service center 2. The service center 2 thus determines the same data in the same manner in this eighth step, here labelled with 800, and then arrives at a calculated position PP3, without the vehicle V1 being able to actively influence the determination of this value. This position is then reliable, regardless of whether the vehicle 1 has been hacked or not, just as it was for the position PP4 of the service center 2. If in step 900, the determined position PP3 and the shared position P3 are again the same, then the validation also occurs on the part of the service center 2, which is shared with the vehicle in a tenth step 1000. Otherwise, the method is aborted in step 910.

Following a positive validation of both participants 1, 2, secured communication can occur, for example as bi-directional communication in the step represented here with 1100. The security of this communication is correspondingly high, since, as has already been described at the beginning of the description, the intrusion of hackers into this communication is virtually impossible or is only possible with extreme effort due to the checking of the physical characteristic in the form of the position of the participants 1, 2. In the context of this communication, the software update from the service center 2 can then, for example, be uploaded to the vehicle 1 in the tenth step 1000. Here, it is possible to secure this communication with a unique key, which is only applicable to the current communication, so that after the end of the communication this key is also essentially useless, should it fall into the wrong hands.

Figure 2:
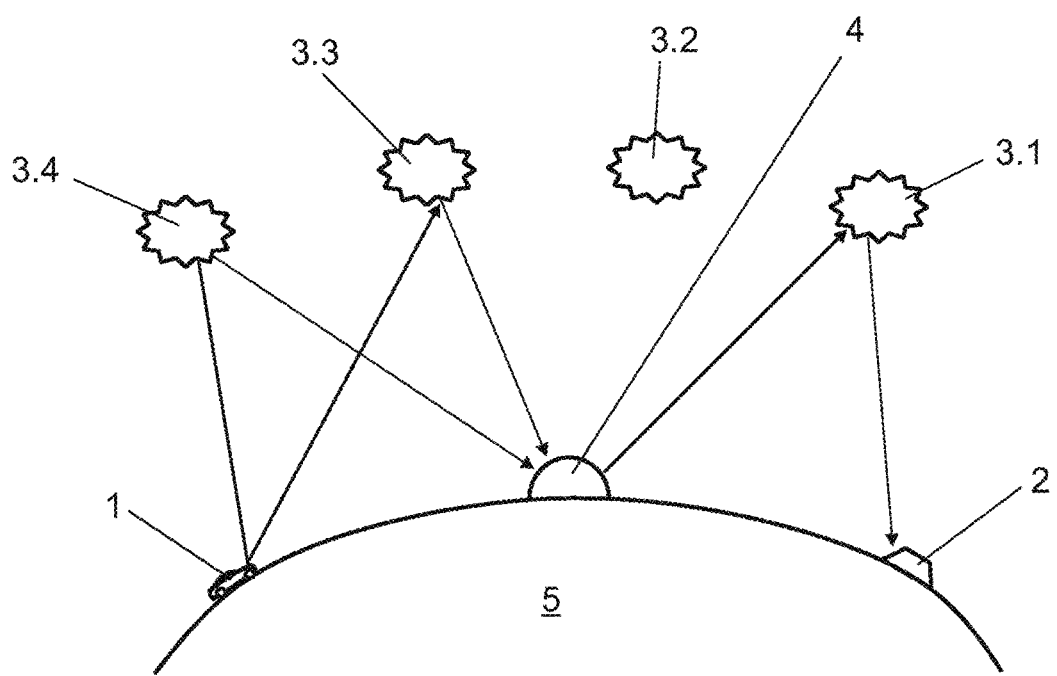
FIG. 2 shows a scenario for determining the position including a satellite control center.

In the depiction of FIG. 2, a first scenario can now be identified. As already mentioned, a vehicle 1 and the service center 2 are here correspondingly represented as two participants on an implied globe 5. In orbit above this globe 5, four individual satellites 3.1, 3.2, 3.3, 3.4 are shown. The satellite control center 4 is also on the earth 5 between the two participants 1, 2, which is included in the communication here as a kind of relay station and service provider. In order to now determine the position of the respective other participant, the service center 2 sends, for example, a short request to the control center 4 via the satellites 3.3 and 3.4, which are above the service center: "Please share where I am with vehicle 1 in position P3." In the control center 4, the position of the service center is now determined based on the delay times of the data between the service center 2 and the satellite 3.4 as well as between the service center 2 and the satellite 3.3, and, in the exemplary embodiment shown here, is correspondingly shared with the vehicle 1 via the satellite 3.1. This vehicle 1 then uses the position received via the control center 4 in this way as the position PP4, and compares this with the position P4 that was shared directly from the service center 2, for example via a mobile data connection.

Figure 3:
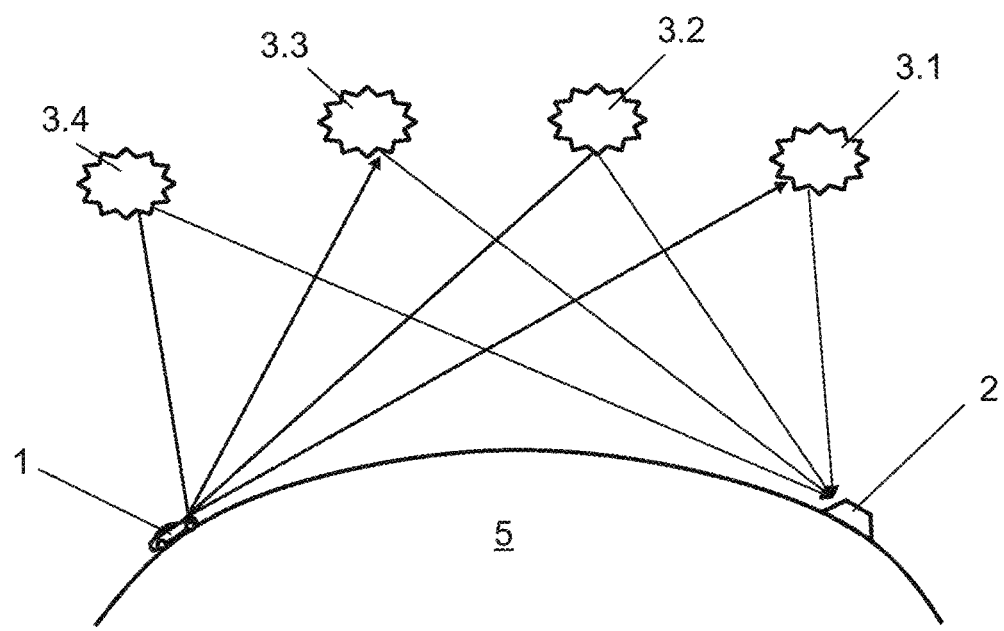
FIG. 3 shows an alternative scenario, without a satellite control center.

In the depiction of FIG. 3, the same scenario is shown again, without the satellite control center 4 having to intervene here. Here, the service center 2 sends a message to the vehicle 1 with a unique time stamp and the individual ID, preferably via four of the satellites 3.1, 3.2, 3.3 and 3.4. The satellites pass on the message and the corresponding signal to the vehicle 1, which can now independently calculate the position of the service center 2, so the position PP4 according to the depiction in FIG. 1 is based on the signal delay times using the individual satellites.

It is here the case that in the scenario as can be identified in the depiction in FIG. 2, the satellite control center 4 plays an active role, in that it precisely determines and correspondingly passes on the position of the service center itself, from the delay times of the signals between the service center 2 and the satellites 3.3 and 3.4, using its own, known position. As an alternative to this, it would also naturally be conceivable for this scenario to be carried out in a similar way to the scenario of FIG. 3. The satellite service center 4 would then only have the function of a relay station, and not that of a service provider. It would then correspondingly pass on the data and provide it with a unique time stamp, which then occurs in place of the previous time stamp, in order that the calculation can be directly carried out in the way that is suited to the participants 1, 2.

In both scenarios, it is now possible for the vehicle 1 to correspondingly compare the two positions, so to correspondingly carry out the step referred to with 500 in the depiction of FIG. 1, and on its part to send data in the reverse direction, in order to make it possible for the service center 2 to do the same for it in step 800. If both positions P3 and P4 have been correctly validated, communication can now securely occur, without the danger of communicating with an unauthorized participant being very high.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for securing communication between at least a first and second participant, the first participant has a first identification and the second participant has a second identification, the method comprising:
   sharing, by the first participant with the second participant, the first identification;
   sharing, by the second participant with the first participant, the second identification;
   transmitting, by the first participant to the second participant, a position of the first participant and a first time stamp, wherein subsequent to the transmission of the position of the first participant and the first time stamp, the method further comprises
   calculating, by the second participant based on a signal delay time between the first and second participants via at least four navigation satellites and using the first time stamp, a position of the first participant; and
   validating the first participant by the second participant based on a comparison of the transmitted position of the first participant and the calculated position of the first participant.

2. The method of claim 1, further comprising:
   transmitting, by the second participant to the first participant, a position of the second participant and a second time stamp;
   calculating, by the first participant based on a signal delay time between the first and second participants via the at least four navigation satellites and using the second time stamp, a position of the second participant; and validating the second participant by the first participant based on a comparison of the transmitted position of the second participant and the calculated position of the second participant.

3. The method of claim 1, wherein the first time stamp and the position of the first participant are automatically transmitted by the first participant.

4. The method of claim 2, wherein the second time stamp and the position of the second participant are automatically transmitted by the second participant.

5. The method of claim 1, wherein the position of the first participant is transmitted to the second participant via at least one relay station, either directly or via a satellite control center.

6. The method of claim 2, wherein the position of the second participant is transmitted to the first participant via at least one relay station, either directly or via a satellite control center.

7. The method of claim 1, further comprising:
validating, by the second participant, the transmitted or calculated position of the first participant using map data.

8. The method of claim 7, wherein places, distances or time periods between saved places and current places are used to validate map data.

9. The method of claim 2, further comprising:
validating, by the first participant, the transmitted or calculated position of the second participant using map data.

10. The method of claim 9, wherein places, distances or time periods between saved places and current places are used to validate map data.

11. The method of claim 1, securely communicating between the first and second participants based on the validation of the first participant.

12. The method of claim 11, wherein the securely communicating between the first and second participants involves transmission of software updates.

13. The method of claim 2, securely communicating between the first and second participants based on the validation of the first and second participants.

14. The method of claim 13, wherein the securely communicating between the first and second participants involves transmission of software updates.

15. A non-transitory computer program product containing instructions for securing communication between at least a first and second participant, the first participant has a first identification and the second participant has a second identification, wherein execution of the instructions by the second participant causes the second participant to:
receive, from the first participant, the first identification;
receive, from the first participant, a position of the first participant and a first time stamp, wherein subsequent to the transmission of the position of the first participant and the first time stamp the instructions cause the second participant to
calculate, based on a signal delay time between the first and second participants via at least four navigation satellites and using the first time stamp, a position of the first participant; and
validate the first participant by the second participant based on a comparison of the received position of the first participant and the calculated position of the first participant.

16. The method of claim 1, wherein the first participant transmits the position of the first participant and the first time stamp to the second participant via the at least four navigation satellites.

17. The non-transitory computer program product of claim 15, wherein the second participant receives the position of the first participant and the first time stamp from the first participant via second participant via the at least four navigation satellites.

\* \* \* \* \*